(12) United States Patent
Stratmann et al.

(10) Patent No.: US 7,694,590 B2
(45) Date of Patent: Apr. 13, 2010

(54) FORCE-MEASURING ELEMENT

(75) Inventors: Andreas Stratmann, Gomaringen (DE); Klaus Kasten, Reutlingen (DE); Sven Lamers, Otterbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/988,223

(22) PCT Filed: May 24, 2006

(86) PCT No.: PCT/EP2006/062589

§ 371 (c)(1),
(2), (4) Date: Feb. 12, 2009

(87) PCT Pub. No.: WO2007/003470

PCT Pub. Date: Jan. 11, 2007

(65) Prior Publication Data

US 2009/0178493 A1    Jul. 16, 2009

(30) Foreign Application Priority Data

Jul. 5, 2005    (DE) .................. 10 2005 031 345

(51) Int. Cl.
*G01L 1/00*    (2006.01)
*G01L 1/04*    (2006.01)

(52) U.S. Cl. .................... 73/862.626; 73/780

(58) Field of Classification Search ............ 73/780, 73/862.626
See application file for complete search history.

(56) References Cited

U.S. PATENT DOCUMENTS

| 4,089,494 | A | * | 5/1978 | Anderson et al. | ........... 244/178 |
| 4,572,006 | A | | 2/1986 | Wolfendale | |
| 4,603,371 | A | * | 7/1986 | Frick | ........ 361/283.3 |
| 5,879,360 | A | | 3/1999 | Crankshaw et al. | |
| 6,104,100 | A | | 8/2000 | Neuman et al. | |
| 6,218,632 | B1 | * | 4/2001 | McCarthy et al. | ........... 177/144 |
| 6,675,656 | B1 | * | 1/2004 | Plochinger | ........... 73/718 |

FOREIGN PATENT DOCUMENTS

| DE | 101 45 369 | 4/2003 |
| DE | 103 30 090 | 1/2005 |

* cited by examiner

*Primary Examiner*—Max Noori
(74) *Attorney, Agent, or Firm*—Kenyon & Kenyon LLP

(57) ABSTRACT

A force-measuring element, having a series connection of at least two capacitors, the force-measuring element being designed in such a way that, under the action of force, a first capacitance of a first capacitor of the at least two capacitors increases and a second capacitance of a second capacitor of the at least two capacitors decreases, in which the force-measuring element is in the form of a connecting element, in which an application of force is provided on a long side of a sleeve of the force-measuring element, and the at least two capacitors are separated by a bar that essentially stands firm during the action of force, so that a first space having the first capacitor above the bar becomes smaller as a result of the application of force, and below the bar a second space becomes larger.

10 Claims, 4 Drawing Sheets

FORCE-MEASURING ELEMENT

BACKGROUND INFORMATION

U.S. Pat. No. 6,218,632 describes a differential capacitor in a force-measuring element. In that case, a middle plate, which is implemented as a double plate and belongs to two serially interconnected capacitors, is able to move as a function of the force exerted. In addition, a spring is provided in the rod via which the force is exerted on this middle plate.

SUMMARY OF THE INVENTION

The force-measuring element of the present invention has the advantage that it is possible to use customary capacitors, and a special capacitor construction as in the related art is not necessary. The present invention is based on the knowledge that capacitors deform elastically up to a certain action of force, that is, after the action of force has ended, these capacitors return again to their original shape. In that context, provided in the force-measuring element is a bar that separates the two capacitors and is essentially fixed, so that in response to a force acting on a sleeve of the force element, an upper space in which the first capacitor is located becomes smaller under the influence of the force, and at the same time, the second space below the bar becomes correspondingly larger. This principle is also known as differential capacitor or capacitor with differential principle. This leads to a change in capacitance that is proportional to the force action. Therefore, the force-measuring element according to the present invention allows a very compact type of construction and, in particular, the force-measuring element may be used as a connecting element, i.e., as a screw or bolt in a seat linkage of a motor-vehicle seat. It is thereby then possible to ascertain the force exerted on the seat by a vehicle occupant or an object. In particular, by the use of several force-measuring elements in the seat linkage, it is possible to infer the distribution of force on the motor-vehicle seat, and thus to trigger passenger protection means such as airbags and seat-belt tensioners in precise and optimized fashion. Because of its compact type of construction, the force-measuring element according to the present invention can also be produced more easily and entails lower production costs.

It is particularly advantageous that the force-measuring element has a component for limiting force, so that this component prevents a force from being exerted on the capacitors which could lead to a plastic deformation or to a change in position of the capacitors in the force-measuring element. Namely, the capacitors are preferably able to be installed in the force-measuring element by a press fit. This is an especially simple installation possibility.

Advantageously, a lead-through may be provided through the component, through which an electrical connection is provided to the capacitors. Naturally, a plurality of lead-throughs may also be provided, in order to lead a plurality of electrical lines through to an evaluation circuit. In particular, the evaluation circuit is mounted on the head of the force-measuring element. The force-measuring element is then linked via electrical, optical or radio link to a control device that, for instance, transmits the measured force values ascertained to an airbag control unit. In this context, the evaluation circuit of the force-measuring element is connected in such a way that a differential evaluation of the capacitances of the capacitors is possible, the relative dielectric constants thereby no longer playing a role in the evaluation, so that only the change in distance due to the effect of force goes into the capacitance change.

The bar, which is able to separate the two capacitors, is advantageously joined in one piece to the sleeve or in one piece to the component. This can be optimized depending on the manufacturing process.

Moreover, it is advantageous that the component itself is implemented as a cover of the force-measuring element, so that the force-measuring element only functions when both the component and the remainder of the force-measuring element are joined to each other, preferably by a radially circumferential welded seam.

Advantageously, the capacitors may also take the form of multilayer capacitors, which can improve the evaluation or the sensitivity of the measuring signal. In such multilayer capacitors, the area of the capacitor is enlarged, a parallel connection of the layers making up this capacitor.

DETAILED DESCRIPTION

Figure 1:
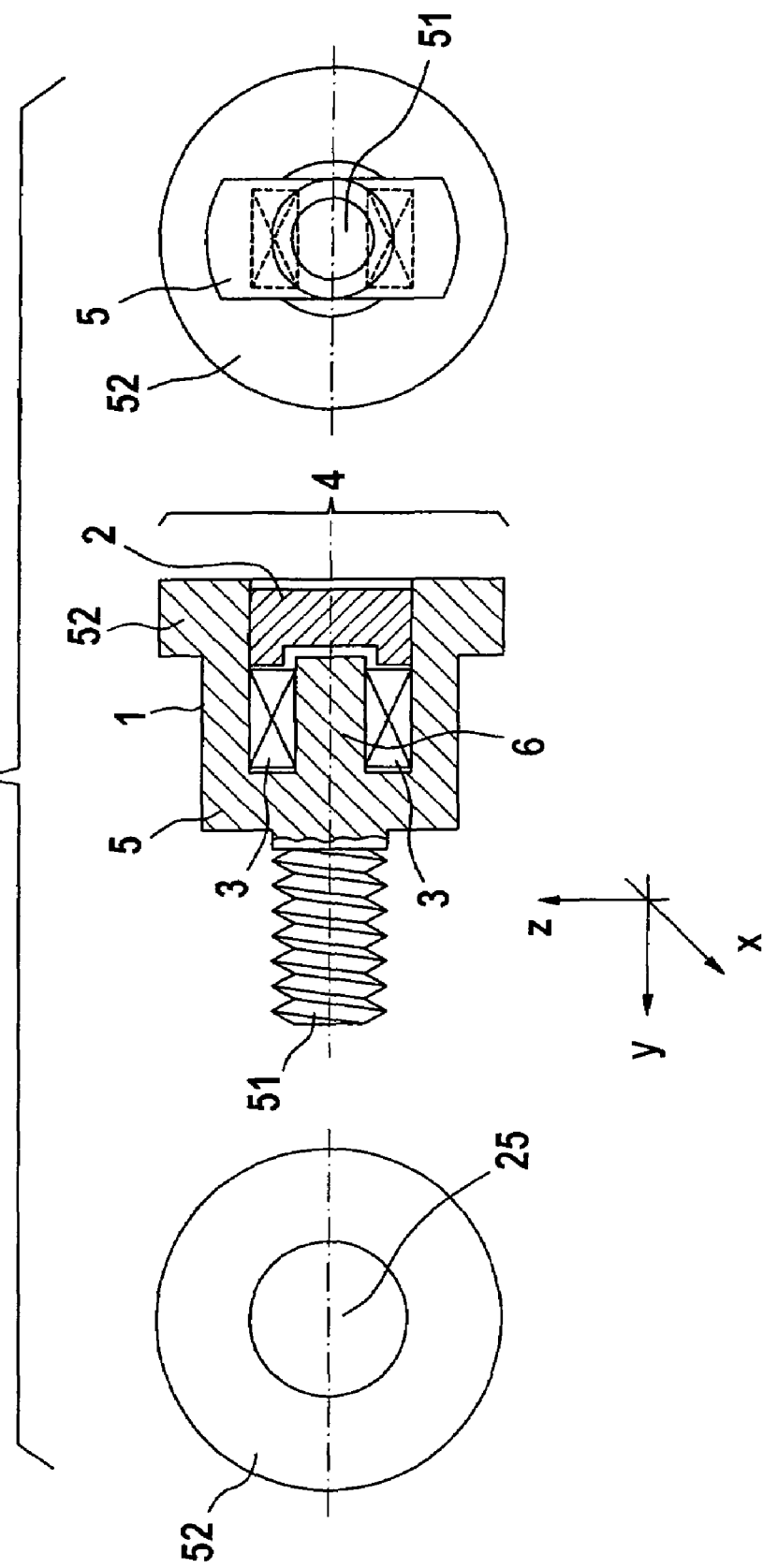
FIG. 1 shows a first exemplary embodiment of the force element according to the present invention.

In seat-force sensors, s-shaped or bar-shaped elements, e.g., single bending bars or double bending bars, may be used which deform in response to the influence of force or torque. The disadvantage of these proposals is the large space required and the difficulty of integrating into existing fastening elements such as screws and bolts. However, the bolt form is necessary for maintaining the so-called H-point, which indicates at what height the hip point of the vehicle occupant is situated with respect to the vehicle floor. That is to say, a substitution of existing elements such as the bolts in a customary motor-vehicle seat must not alter the H-point. However, by installing a force-measuring element, e.g., under a seat, even under the seat rail, this point would be changed, namely, would be raised.

According to the present invention, it is provided to design the force-measuring element in such a way that the force-measuring element is usable as a connecting element, and the force acts vertically on the long side of the force element, so that the bolt application or screw application is possible, and the capacitors are separated by a bar that essentially stands firm during the application of force, so that the space above the bar becomes smaller and below the bar becomes larger. According to the present invention, the force-measuring element is designed in such a way that the force-measuring element is usable as a connecting element, and the force introduced acts vertically on the long side of the force-measuring element. Due to the unequal relation of width to height, to the greatest possible extent, forces in the transverse direction are not transmitted to the capacitors, and therefore are also not measured. Therefore, a sole substitution of the bolts present between the seat and the seat rail is possible without both the connecting function and the measuring function thereby possibly being limited.

These changes of the space, owing to the capacitors placed there, bring about a change in the capacitance of these capacitors. The influence of force is proportioned in such a way that only an elastic change of the capacitors results, so that after the action of force has ended, these capacitors resume their original shape, and therefore the original capacitance. The force-measuring element of the present invention has the feature of a simple geometry. In addition, a component may be provided which limits force (see component 2). That is to say, if a force above this force limit is introduced into the force-measuring element, then this force is no longer exerted on the capacitors, i.e., the spaces no longer change further in size, since the component diverts this force. Thus, a mechanical short circuit exists. Therefore, an essence of the present invention is the use of capacitances, via which it is possible to determine a change in distance. Suitable capacitances are integrated into the force-measuring element in such a way that the main measuring direction points in the vehicle Z-direction, thus in the vertical direction. The measurement of forces of varied orientation is thereby made possible.

The measuring principle is selected in such a way that it is possible to minimize the space required, especially the overall length, that the restriction of acting forces is possible, and that produceability is simplified using standard components.

A central feature of the sensor is the vertical, plate-distance-changing measuring principle. The capacitor plates should be aligned in parallel relative to each other, and should move toward or away from each other depending on the load. That is to say, measure d changes, so that according to the equation $$C = \varepsilon_O * \varepsilon_R * \frac{A}{d}$$

the capacitance of the sensor changes.

Figure 4:
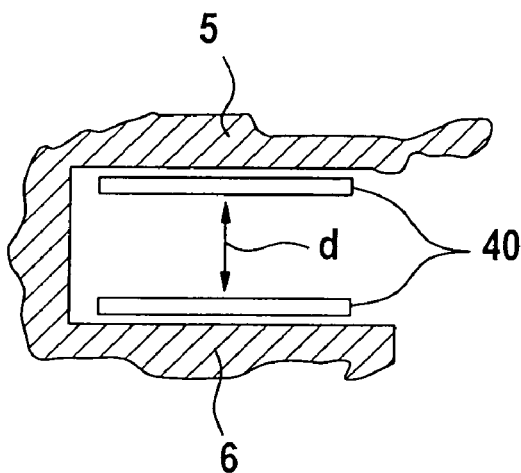
FIG. 4 shows the underlying functional principle.

FIG. 4 clarifies this measuring principle. A sleeve 5, into which the force is introduced onto the force-measuring element, accommodates by press fit a capacitor having capacitor plates 40, a part of sleeve 5 here being in the form of bar 6 which is projecting and essentially does not change upon the application of force. In response to a force attack, distance d will decrease, since sleeve 5 is pressed in the direction of the capacitor. That is, capacitor plates 40 move toward each other. Correspondingly, the space below bar 6 enlarges due to the effect of force on sleeve 5. Thus the press fit of the corresponding capacitor thereby becomes slacker, so that distance d increases there, i.e., the capacitor plates move away from each other.

Figure 5:
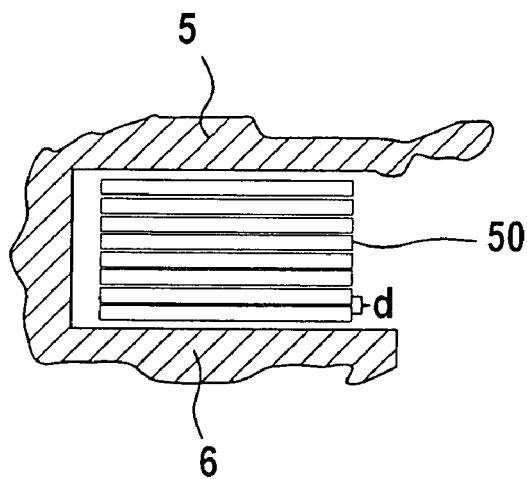
FIG. 5 shows a multilayer capacitor.

FIG. 5 shows an advantageous further refinement. A capacitor is inserted between sleeve 5 and bar 6 in a press fit here, as well. Now, however, the capacitor is in the form of a so-called multilayer capacitor or capacitor stack. In this case, several layers are connected in parallel in order to enlarge the overall capacitor area. Here as well, however, an application of force on sleeve 5 has an effect on distance d between the layers, so that this also leads to a change in capacitance whose swing is higher here than for a capacitor according to FIG. 4.

FIG. 1 shows a first specific embodiment of the force-measuring element according to the present invention. FIG. 1 shows a side view and, correspondingly, a front view and a back view. The side view, which here is also illustrated as an intersection, shows the force-measuring element having a sleeve 5, a thread 51, bar 6 that is joined in one piece to sleeve 5 and is situated in the middle of the force-measuring element, a component 2 that is intended for limiting the application of force and is introduced centrally as a cover between sleeve 5, as well as capacitors 3 which were inserted in a press fit between sleeve 5 and middle bar 6, in each case symmetrically with respect to the center line. For the sake of simplicity, electrical connecting lines to the capacitors have been omitted here; however, they are passed through component 2 by way of a lead-through. A sleeve circle 52 runs around the force-measuring element. An evaluation circuit is provided at the location designated by reference numeral 4. Thus, this denotes the screw or bolt head.

By an application of force in the negative Z-direction at point 1, sleeve 5 is elastically deformed in the negative direction in the area of capacitors 3 used. A differential arrangement of the system results due to fixed, projecting bar 6. In the case of a force attacking at point 1 in the negative Z-direction, the free space above the axis of symmetry, thus above bar 6, in which a capacitor 3 is located becomes smaller, and the free space below the axis of symmetry, thus below bar 6, in which a capacitor is likewise located becomes larger. The application of force for the deflection of the lower part of sleeve 5 occurs via sleeve circle 52. In so doing, the force is introduced into point 1, is transmitted via sleeve circle 52 into the lower part of sleeve 5, and thereby elastically deforms the lower part of sleeve 5.

So that capacitors 3 can not deviate from the positions assigned to them, they are inserted under pressure. That is, capacitors 3 are secured via a press fit between sleeve 5 and capacitor 3, and between capacitor 3 and projecting bar 6.

To prevent overloading of capacitors 3 due to excessive compression, and to prevent a change in position owing to enlargement of the free space, a component 2 is integrated into the structure. By restricting the bar movement, an excessive relative movement between middle projecting bar 6 and concentric-running sleeve circle 52 is avoided. The electrical connection to evaluation circuit 4 may be passed through component 2.

The two capacitors 3 are to be evaluated differentially. This means that at one moment, both signals are incorporated into the output signal. By the differential observation, the influence of a changing dielectric constant is avoided. The relationship is made up by:

$$C = \frac{C1 - C2}{C1 + C2}$$

so that the dielectric constants cancel each other out.

According to FIG. 1, a variant can again be found in which bar 6 is a part of sleeve 5. This has the advantage that the basic function of the sensor is realized by one component part. A joining of two component parts, which ensures the functionality of the sensor, is not necessary. From this it follows that component 2 can be used optionally.

Figure 2:
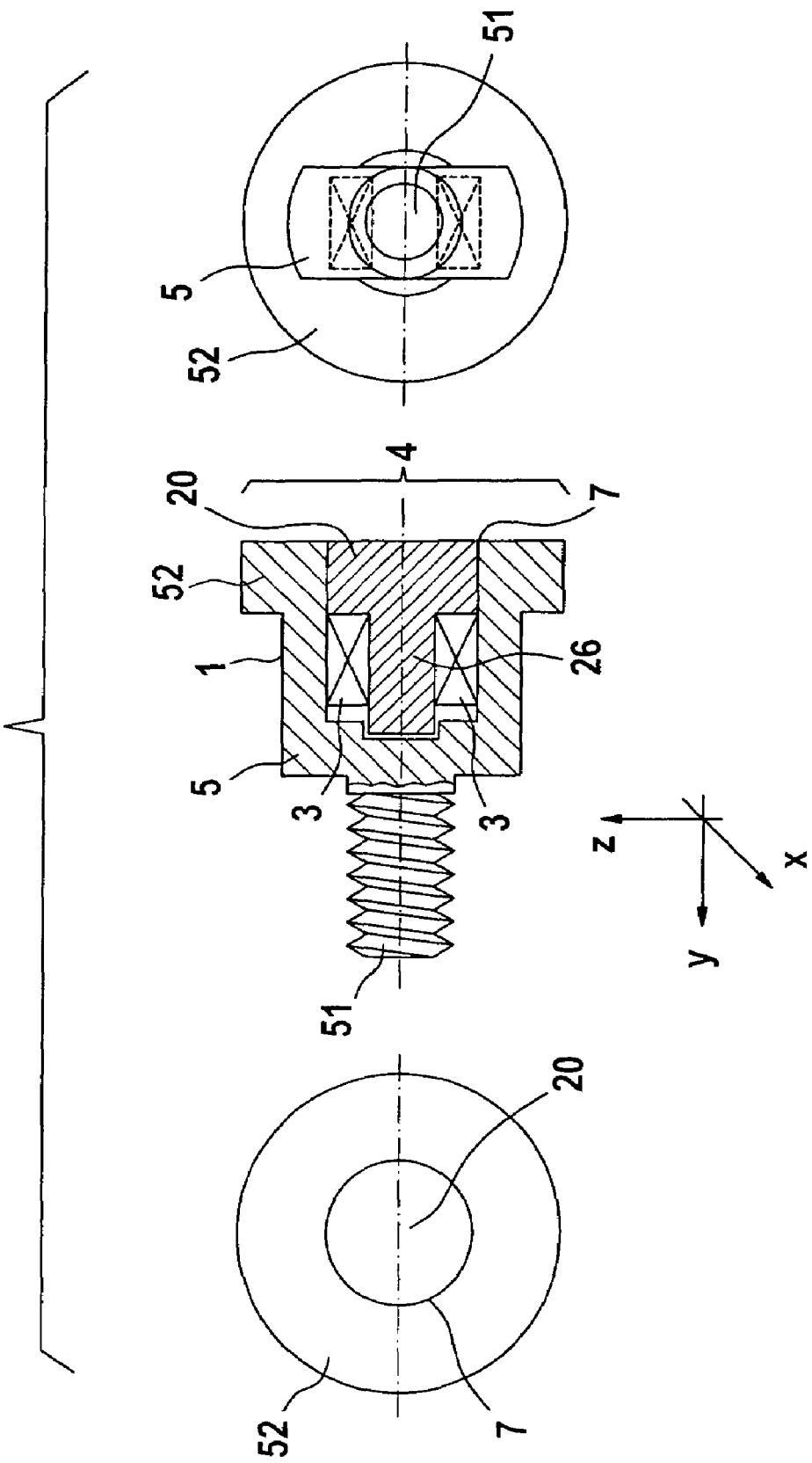
FIG. 2 shows a second exemplary embodiment of the force element according to the present invention.

FIG. 2 shows a second specific embodiment of the device according to the present invention; back view, side view and front view are again illustrated. In contrast to FIG. 1, bar 26 is now part of component 20, which has the function of limiting force. In addition, component 20 terminates flush with sleeve circle 52. Therefore, between sleeve circle 52 and component 20, a joint 7 must be provided, e.g., by welding. The variant according to FIG. 2 has the advantage that there is greater compensation of the torque about the X-axis. Thus, that is the axis of symmetry. Since in this case, the sensor function cannot be fulfilled solely by sleeve 5, a joint must be applied at axially symmetrical seam 7.

Figure 3:
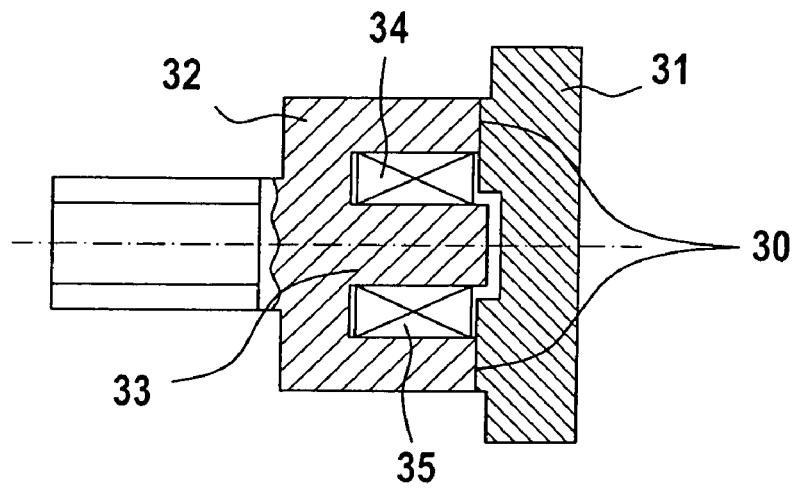
FIG. 3 shows a third specific embodiment of the force element according to the present invention.

FIG. 3 shows a further specific embodiment of the force-measuring element according to the present invention. Sleeve 32 is again joined in one piece with middle bar 33. Capacitors 34 and 35 are thereby retained in the press fit. Component 31 is now joined to sleeve 32 by welded seams 30, so that component 31 now forms a cover for the force-measuring element and, in terms of the diameter, is larger than the remaining components of the force-measuring element.

Figure 6:
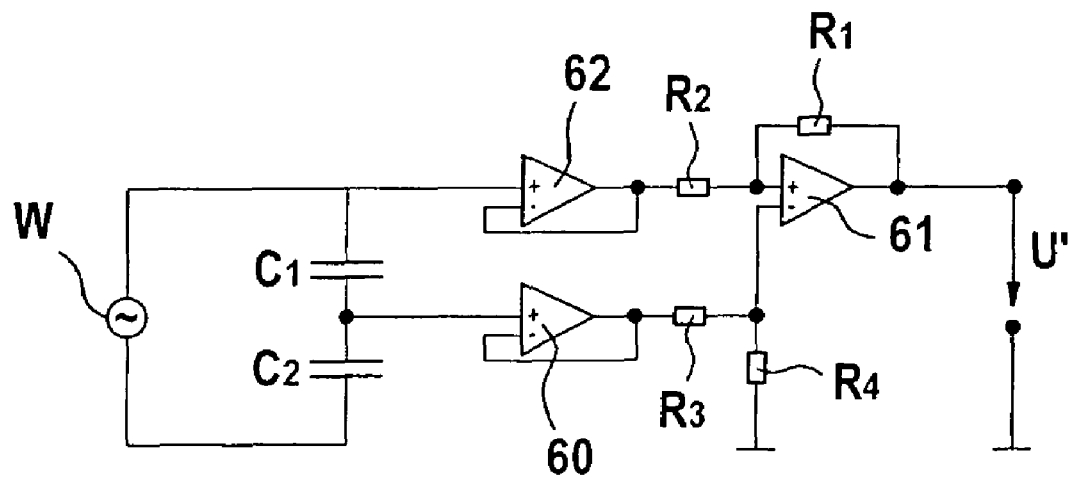
FIG. 6 shows a first specific embodiment of an evaluation circuit.

FIG. 6 shows a first embodiment of an evaluation circuit of the force-measuring element according to the present invention. Capacitors C1 and C2 are isolated and are energized by an AC voltage source W. At the center tap between C1 and C2, a line leads to the positive input terminal of an operational amplifier 60, whose negative input is coupled back to its output. Between C1 and the AC voltage source, a further operational amplifier 62 is connected with its positive input terminal. The negative input terminal is coupled to the output of operational amplifier 62 here, as well. Furthermore, the output of operational amplifier 60 is connected to a resistor R3 that, on its other side, is connected first of all to a negative input terminal of an operational amplifier 61 and to a resistor R4 connected to ground. Also connected to the output of operational amplifier 62, in addition to the feedback, is a resistor R2 which, on its other side, is connected to a resistor R1 and to the positive input terminal of operational amplifier 61. Resistor R1 is connected on its other side to the output of operational amplifier 61. Signal U is able to be tapped off at this output.

The circuit permits the differential evaluation of the capacitances, so that signal U is proportional to the force attack.

Figure 7:
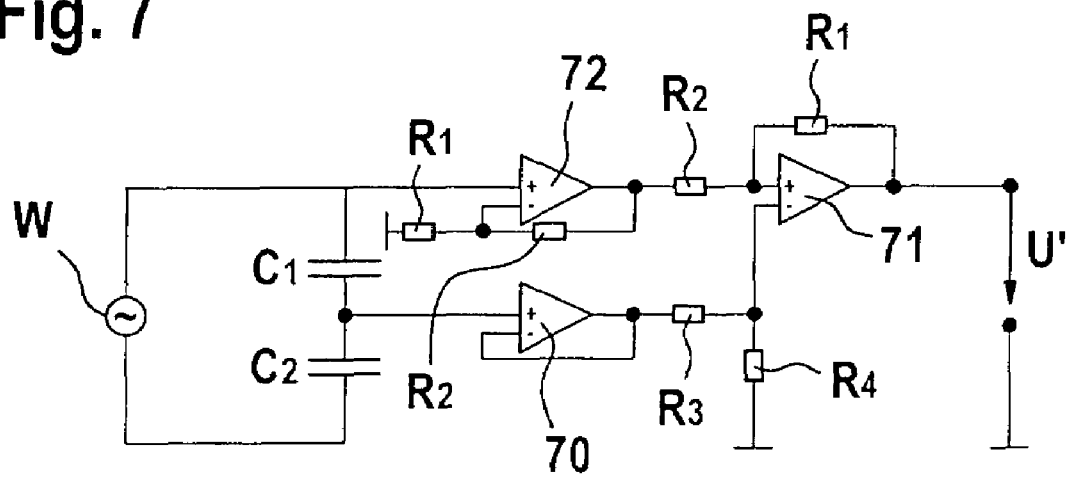
FIG. 7 shows a second specific embodiment of the evaluation circuit.

FIG. 7 shows a variant. Here as well, an AC voltage source W is connected to serially connected C1 and C2, an operational amplifier 70 again being connected at the center tap, and specifically with its positive input terminal. At the negative input terminal of operational amplifier 70, a feedback line is provided to its output. Also connected to an output of operational amplifier 70 is a resistor R3 which, on the other side, is connected to a negative input terminal of operational amplifier 71 and to a resistor R4 connected to ground. The positive input terminal of an operational amplifier 72 is connected between AC voltage source W and capacitor C1, the negative input terminal being connected to a resistor R1 and a resistor R2, resistor R1 being connected to ground. Resistor R2 is coupled back to the output of operational amplifier 72. Also connected to the output of operational amplifier 72 is a resistor R2 which, on its other side, is connected with the positive input terminal to operational amplifier 71 and with resistor R1 that, in turn, is connected to the output of operational amplifier 71. At the output of operational amplifier 71, signal U is able to be tapped off, which again is characteristic for the force exerted on capacitors C1 and C2. Further evaluation circuits are conceivable here, which are also able to be integrated or to be set up discreetly.

What is claimed is:

1. A force-measuring element comprising:
   a series connection of at least two capacitors, wherein, under an action of force, a first capacitance of a first capacitor of the at least two capacitors increases and a second capacitance of a second capacitor of the at least two capacitors decreases;
   a sleeve;
   a sleeve circle for transmitting an action of force to the sleeve, wherein the sleeve circle is a radially-encompassing element of the force-measuring element;
   a connecting element, in which the action of force is provided on a long side of the sleeve; and
   a solid bar separating the at least two capacitors that stands substantially firm during an application of force, so that a first space having the first capacitor above the bar becomes smaller as a result of the application of force, and below the bar a further space having the second capacitor becomes larger.

2. The force-measuring element according to claim 1, further comprising a force-limiting component for preventing the application of force which causes at least one of an overloading and a change in position of the at least two capacitors.

3. The force-measuring element according to claim 1, wherein the at least two capacitors are installed in the force-measuring element by a press fit.

4. The force-measuring element according to claim 2, wherein the component has at least one lead-through for an electrical connection of the at least two capacitors.

5. The force-measuring element according to claim 1, wherein the force-measuring element evaluates the first capacitance and the second capacitance differentially.

6. The force-measuring element according to claim 1, wherein the bar and the sleeve are in one piece.

7. The force-measuring element according to claim 2, wherein the bar and the component are in one piece.

8. The force-measuring element according to claim 2, wherein the component is implemented as a cover of the force-measuring element.

9. The force-measuring element according to claim 1, wherein the at least two capacitors are multilayer capacitors.

10. The force-measuring element according to claim 1, wherein the connecting element is a thread of a bolt or screw.

* * * * *